United States Patent
Cheng et al.

(10) Patent No.: US 10,963,213 B2
(45) Date of Patent: Mar. 30, 2021

(54) PLAYBACK SYNCHRONIZATION METHOD AND DEVICE AND USB SOUND CARD

(71) Applicant: GOERTEK TECHNOLOGY CO., LTD., Qingdao (CN)

(72) Inventors: Lin Cheng, Qingdao (CN); Huijun Li, Qingdao (CN)

(73) Assignee: GOERTEK TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/651,168

(22) PCT Filed: Dec. 22, 2017

(86) PCT No.: PCT/CN2017/118089
§ 371 (c)(1),
(2) Date: Mar. 26, 2020

(87) PCT Pub. No.: WO2019/090928
PCT Pub. Date: May 16, 2019

(65) Prior Publication Data
US 2020/0272410 A1    Aug. 27, 2020

(30) Foreign Application Priority Data

Nov. 7, 2017 (CN) .......................... 201711083439.5

(51) Int. Cl.
*G06F 3/16* (2006.01)
*G06F 13/362* (2006.01)
*G06F 13/42* (2006.01)

(52) U.S. Cl.
CPC ............ *G06F 3/165* (2013.01); *G06F 13/362* (2013.01); *G06F 13/4282* (2013.01); *G06F 2213/0042* (2013.01)

(58) Field of Classification Search
CPC ........... G11B 2020/10638; G11B 2020/10666; G11B 2020/10703; G11B 2020/1062;
(Continued)

(56) References Cited

U.S. PATENT DOCUMENTS

| | | | | |
|---|---|---|---|---|
| 5,918,073 A | * | 6/1999 | Hewitt | .................... G06F 3/061 |
| | | | | 377/47 |
| 2003/0063627 A1 | * | 4/2003 | Toshitani | .............. H04J 3/0632 |
| | | | | 370/503 |

(Continued)

FOREIGN PATENT DOCUMENTS

| | | |
|---|---|---|
| CN | 1464685 A | 12/2003 |
| CN | 101296217 A | 10/2008 |

(Continued)

OTHER PUBLICATIONS

First Office Action issued in Japanese Patent Application No. 201711083439.5 dated Jun. 11, 2020.
International Search Report issued in PCT/CN2017/0118089 dated Aug. 13, 2018.
Second Office Action issued in Chinese Patent Application No. 201711083439.5 dated Oct. 30, 2020.

*Primary Examiner* — Fan S Tsang
*Assistant Examiner* — David Siegel
(74) *Attorney, Agent, or Firm* — Fox Rothschild LLP; Carol E. Thorstad-Forsyth

(57) ABSTRACT

A playback synchronization method and device and a USB sound card are disclosed. In the technical solutions according to the present disclosure, the number of writes for writing data into the audio data buffer by the write pointer of the master device and the number of reads for reading data from the audio data buffer by the read pointer of the slave device are acquired, and it is determined whether the data transmission of the master and slave devices is synchronized or not by judging the magnitude relationship between the number of writes and the number of reads. If it is not synchronized, the position of the read pointer is (Continued)

adjusted so that the write pointer and the read pointer are synchronized again, i.e., the write data and the read data are synchronized again. Thus, the problem that the clocks of the master and slave devices are relatively independent and the data transmission is not synchronized due to the clock deviation is solved.

9 Claims, 2 Drawing Sheets

(58) Field of Classification Search
CPC ........... G11B 2020/10898; G11B 2020/10546; G11B 2020/10675; G11B 2020/10685; G11B 2020/10694; G11B 2020/10712; G11B 2020/10722; G11B 2020/10731; G11B 2020/10805; G11B 2020/10814; G06F 3/165; G06F 13/362; G06F 13/4282; G06F 2213/0042
See application file for complete search history.

(56) References Cited

U.S. PATENT DOCUMENTS

| | | |
|---|---|---|
| 2006/0230215 A1 | 10/2006 | Woodral |
| 2006/0280483 A1 | 12/2006 | Tsuruga |
| 2013/0108083 A1 | 5/2013 | Cheng et al. |
| 2015/0235342 A1 | 8/2015 | Asai et al. |
| 2018/0091570 A1* | 3/2018 | Hardt ..................... H04L 43/16 |

FOREIGN PATENT DOCUMENTS

| | | |
|---|---|---|
| CN | 102591815 A | 7/2012 |
| CN | 103093778 A | 5/2013 |
| CN | 104603868 A | 5/2015 |
| CN | 107277295 A | 10/2017 |
| CN | 107293316 A | 10/2017 |

* cited by examiner

PLAYBACK SYNCHRONIZATION METHOD AND DEVICE AND USB SOUND CARD

CROSS-REFERENCE TO RELATED APPLICATIONS

The present application is a U.S. National Stage entry under 35 U.S.C. § 371 based on International Application No. PCT/CN2017/118089, filed on Dec. 22, 2017, which claims priority to Chinese Patent Application No. 2017/11083439.5, entitled "PLAYBACK SYNCHRONIZATION METHOD AND DEVICE AND USB SOUND CARD" and filed on Nov. 7, 2017, the contents of which are incorporated herein by reference in their entirety.

TECHNICAL FIELD

The present disclosure relates to the field of communication data transmission, in particular, to a playback synchronization method and device and a USB sound card.

BACKGROUND

The playback of video or audio in a device typically involves signal conversion and data transmission operations between two devices. The two devices for data transmission are a master device and a slave device. When data is transmitted between the master device and the slave device, since the clock sources of the master device and the slave device are relatively independent, the clock deviation of the master device and the slave device may cause the data transmission to be out of synchronization, which may further lead to problems such as sound loss or distortion. With respect to the problem of clock non-synchronization between the master and slave devices, there have been many methods proposed in the prior art such as adding peripheral circuits. However, the addition of peripheral circuits will increase the design complexity and costs of the master and slave devices.

SUMMARY

In order to solve the problems such as sound loss and distortion caused by clock non-synchronization between the master and slave devices as described above in the background part, the present disclosure provides a playback synchronization method and device and a USB sound card.

According to an aspect of the present disclosure, a playback synchronization method is provided, and the method comprises:

accumulating a number of writes for writing data into an audio data buffer by a write pointer of a master device and a number of reads for reading data from the audio data buffer by a read pointer of a slave device, respectively, and judging a magnitude relationship between the number of writes and the number of reads when the number of writes reaches a predetermined number of times;

if the number of writes is greater than the number of reads, moving the read pointer of the slave device in the audio data buffer towards a read direction by a certain length, the certain length being a product of a difference between the number of writes and the number of reads and a length of a single data packet; and if the number of writes is less than the number of reads, directing the read pointer of the slave device to a zero data buffer, and then when a number of new writes for newly writing data into the audio data buffer by the write pointer of the master device is equal to the difference between the number of reads and the number of writes, re-directing the read pointer of the slave device to an original position in the audio data buffer.

Preferably, the method further comprises: periodically acquiring a write position of the write pointer of the master device in the audio data buffer and a read position of the read pointer of the slave device in the audio data buffer;

if a difference between the write position and the read position is less than the length of the single data packet, or the difference between the write position and the read position is greater than a difference between a length of the audio data buffer and the length of the single data packet, emptying data in the audio data buffer and clearing the number of writes and the number of reads.

Preferably, after moving the read pointer of the slave device in the audio data buffer towards a read direction by a certain length, or re-directing the read pointer of the slave device to an original position in the audio data buffer, the method further comprises:

clearing the number of writes and the number of reads, and re-accumulating the number of writes and the number of reads, respectively.

According to another aspect of the present disclosure, a playback synchronization device is provided, and the device comprises:

a number accumulating unit configured to accumulate a number of writes for writing data into an audio data buffer by a write pointer of a master device and a number of reads for reading data from the audio data buffer by a read pointer of a slave device respectively;

a judging unit configured to judge a magnitude relationship between the number of writes and the number of reads when the number of writes reaches a predetermined number of times;

a first processing unit configured to, if the judging unit judges that the number of writes is greater than the number of reads, move the read pointer of the slave device in the audio data buffer towards a read direction by a certain length, the certain length being a product of a difference between the number of writes and the number of reads and a length of a single data packet; and a second processing unit configured to, if the judging unit judges that the number of writes is less than the number of reads, direct the read pointer of the slave device to a zero data buffer, and then when a number of new writes for newly writing data into the audio data buffer by the write pointer of the master device is equal to the difference between the number of reads and the number of writes, re-direct the read pointer of the slave device to an original position in the audio data buffer.

Preferably, the device further comprises:

a position acquiring unit configured to periodically acquire a write position of the write pointer of the master device in the audio data buffer and a read position of the read pointer of the slave device in the audio data buffer; and a data emptying unit configured to, if a difference between the write position and the read position is less than the length of the single data packet, or the difference between the write position and the read position is greater than a difference between a length of the audio data buffer and the length of the single data packet, empty data in the audio data buffer and clear the number of writes and the number of reads.

Preferably, the device further comprises:

a number clearing unit configured to clear the number of writes and the number of reads, and re-accumulate the number of writes and the number of reads, respectively, after moving the read pointer of the slave device in the audio data buffer towards a read direction by a certain length, or re-directing the read pointer of the slave device to an original position in the audio data buffer.

According to yet another aspect of the present disclosure, a USB sound card is provided, and the USB sound card comprises: an audio data buffer, a zero data buffer, a number accumulating unit, a judgment unit, a first processing unit and a second processing unit;

the number accumulating unit is configured to accumulate a number of writes for writing data into the audio data buffer by a write pointer of a master device and a number of reads for reading data from the audio data buffer by a read pointer of a slave device respectively;

the judging unit is configured to judge a magnitude relationship between the number of writes and the number of reads when the number of writes reaches a predetermined number of times;

the first processing unit is configured to, if the judging unit judges that the number of writes is greater than the number of reads, move the read pointer of the slave device in the audio data buffer towards a read direction by a certain length, the certain length being a product of a difference between the number of writes and the number of reads and a length of a single data packet; and the second processing unit is configured to, if the judging unit judges that the number of writes is less than the number of reads, direct the read pointer of the slave device to the zero data buffer, and then when a number of new writes for newly writing data into the audio data buffer by the write pointer of the master device is equal to the difference between the number of reads and the number of writes, re-direct the read pointer of the slave device to an original position in the audio data buffer.

Preferably, the USB sound card further comprises:

a position acquiring unit configured to periodically acquire a write position of the write pointer of the master device in the audio data buffer and a read position of the read pointer of the slave device in the audio data buffer; and a data emptying unit configured to, if a difference between the write position and the read position is less than the length of the single data packet, or the difference between the write position and the read position is greater than a difference between a length of the audio data buffer and the length of the single data packet, empty data in the audio data buffer and clear the number of writes and the number of reads.

Preferably, the USB sound card further comprises:

a number clearing unit configured to clear the number of writes and the number of reads, and re-accumulate the number of writes and the number of reads, respectively, after moving the read pointer of the slave device in the audio data buffer towards a read direction by a certain length, or re-directing the read pointer of the slave device to an original position in the audio data buffer.

According to still yet another aspect of the present disclosure, a USB sound card is provided, and the USB sound card comprises: an audio data buffer, a zero data buffer, a memory and a processor, the memory and the processor are communicatively connected via an internal bus, the memory stores therein a computer program executable by the processor, and when executed by the processor, the computer program is capable of implementing the above method.

The beneficial effects of the present disclosure are as follows.

According to the technical solution of the present disclosure, when the master device writes data and the slave device reads data, the number of reads for reading data by the read pointer and the number of writes for writing data by the write pointer are acquired, and it is detected whether the read and write operations are synchronized or not by judging the magnitude relationship between the number of writes and the number of reads. When the read and write operations are not synchronized, the operation for reading data is adjusted accordingly so that the read data and the write data are synchronized. By adopting the technical solution, the data synchronization of the master and slave devices can be realized by a software method without adding peripheral circuits, so the hardware design is simplified. Since the synchronization process is carried out in time when the data transmission is not synchronized, data loss in the synchronization process is reduced, and the synchronization accuracy of the read data and the write data is improved.

BRIEF DESCRIPTION OF DRAWINGS

The accompanying drawings, which constitute a part of the present disclosure, are intended to provide a further understanding of the present disclosure. The illustrative embodiments of the present disclosure and the description thereof are intended to explain the present disclosure, and will not constitute unduly restriction of the present disclosure in any way. In the drawings.

DETAILED DESCRIPTION

In order to solve the technical problem as stated in the background part, the inventors of the present application contemplate the use of a software method, in which the read data of the slave device and the write data of the master device are synchronized by adjusting the operation for reading data, thereby achieving the playback synchronization. In order to make the object, technical solutions and advantages of the present disclosure clearer, the embodiments of the present disclosure will be further described in detail in conjunction with the accompanying drawings.

First Embodiment

Figure 1:
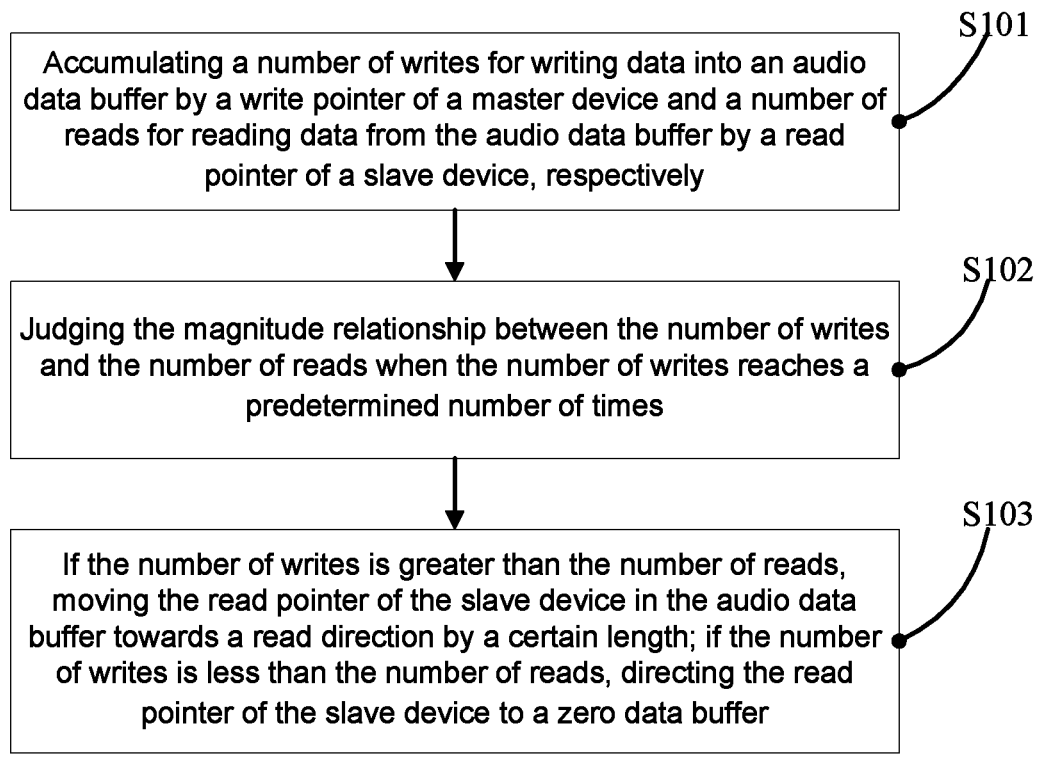
FIG. 1 is a flowchart of a playback synchronization method according to an embodiment of the present disclosure.

FIG. 1 is a flowchart of a playback synchronization method according to an embodiment of the present disclosure. Referring to FIG. 1, the playback synchronization method of the present embodiment comprises:

Step S101, a number of writes for writing data into an audio data buffer by a write pointer of a master device and a number of reads for reading data from the audio data buffer by a read pointer of a slave device are accumulated, respectively.

Step 102, when the number of writes reaches a predetermined number of times, the magnitude relationship between the number of writes and the number of reads is judged.

The number of writes is incremented by one each time the master device writes data into the audio data buffer; meanwhile, the number of reads is incremented by one each time the slave device reads the data from the audio data buffer. The master and slave devices write and read data respectively once each time a predetermined period of time has elapsed. Since the clocks of the master and slave devices are relatively independent, the clock deviation of the master and slave devices may cause the speed of writing data and the speed of reading data to be out of synchronization, and may further lead to the situation that the number of writes and the number of reads are inconsistent. When the number of writes is accumulated to a predetermined number of times, the number of reads of the slave device at the moment is acquired and compared with the number of writes to judge the magnitude relationship between them, thereby the relative speed of writing data by the master device and reading data by the slave device can be known.

Step 103, if the number of writes is greater than the number of reads, the read pointer of the slave device is moved in the audio data buffer towards the read direction by a certain length; if the number of writes is less than the number of reads, the read pointer of the slave device is directed to a zero data buffer.

When the master device writes data and the slave device read data, the length of each write data and each read data is the length of one data packet. If the number of writes is greater than the number of reads, it indicates that the speed of writing data by the master device is faster than the speed of reading data by the slave device, and the write data is not synchronized with the read data. If no measure is taken, the deviation between the writing data by the master device and reading data of the slave device by the slave device will be increasingly larger, which may lead to the phenomenon of sound loss during playback of the device. At this point, the read pointer of the slave device is moved in the audio data buffer towards the read direction by a certain length so that the write data and the read data are synchronized. The certain length of movement is the product of the difference between the number of writes and the number of reads and the length of a single data packet. Such an operation keeps the distance between the read pointer and the write pointer equal to the distance at the starting moment, and the read pointer is again synchronized with the write pointer.

If the number of writes is less than the number of reads, it indicates that the speed of writing data by the master device is slower than the speed of reading data by the slave device, and the write data is not synchronized with the read data, either. If no measure is taken, it may lead to the phenomenon of sound distortion during playback of the device. At this point, the read pointer of the slave device is directed to the zero data buffer, data 0 in the zero data buffer will be read, and the data written by the master device will no longer be read from the audio data buffer. When the number of new writes for newly writing data into the audio data buffer by the write pointer of the master device is equal to the difference between the number of reads and the number of writes, the read pointer of the slave device is re-directed to an original position in the audio data buffer. After the read pointer is directed to the zero data buffer, the write pointer continues to write data to the audio data buffer, and when the number of times that the data is continued to be written is equal to the difference between the number of reads and the number of writes at judgment, the read pointer leaves the zero data buffer and is redirected to the position in the audio data buffer where the read pointer was before it left, and starts reading the data.

If the number of writes is equal to the number of reads, it indicates that the speed of writing data is equal to the speed of reading data, and they are in a synchronized state. At this point, no operation is needed on the read pointer.

In an embodiment of the present disclosure, the playback synchronization method further comprises a step of judging position. Specifically, the write position of the write pointer of the master device in the audio data buffer and a read position of the read pointer of the slave device in the audio data buffer are acquired periodically. The object of acquiring the write position of the write pointer and the read position of the read pointer is to determine whether the write data and the read data exceed a limit state. If a difference between the write position and the read position is less than the length of a single data packet, or the difference between the write position and the read position is greater than the difference between the length of the audio data buffer and the length of a single data packet, it indicates that the relative state of the write data and the read data has exceeded the limit state. If the difference between the write position and the read position is less than the length of a single data packet, it indicates that the read pointer reads data too fast, and if the read pointer continues to read data, the position of reading data may exceed the position of writing data by the write pointer, which may lead to data overflow. If the difference between the write position and the read position is greater than the difference between the length of the audio data buffer and the length of a single data packet, it indicates that the read pointer reads data too slow, and if the write pointer continues to write the data, the unread data may be covered, which may lead to data loss. When the write position of the write pointer and the read position of the read pointer are acquired, and it is judged that the difference between them is in the above two limit states, the data in the audio data buffer area is emptied, the write pointer and the read pointer are emptied, the accumulated number of writes and number of reads are cleared, and the data are written and read from the beginning so as to synchronize the read data and the write data and ensure the integrity of the read data and the write data.

In an embodiment of the present disclosure, each time the judgment of the magnitude relationship between the number of writes and the number of reads is completed, the read pointer of the slave device performs a corresponding movement operation. After the movement operation is completed, the number of writes and the number of reads need to be accumulated again, so as to perform the next acquisition and judgment. Specifically, after the movement operation of the read pointer, i.e. moving the read pointer of the slave device in the audio data buffer towards a read direction by a certain length, or re-directing the read pointer of the slave device to an original position in the audio data buffer, is completed so that the read data and the write data are synchronized, the number of writes and the number of reads are cleared to restart the accumulation and wait for the next judgment.

Second Embodiment

Figure 2:
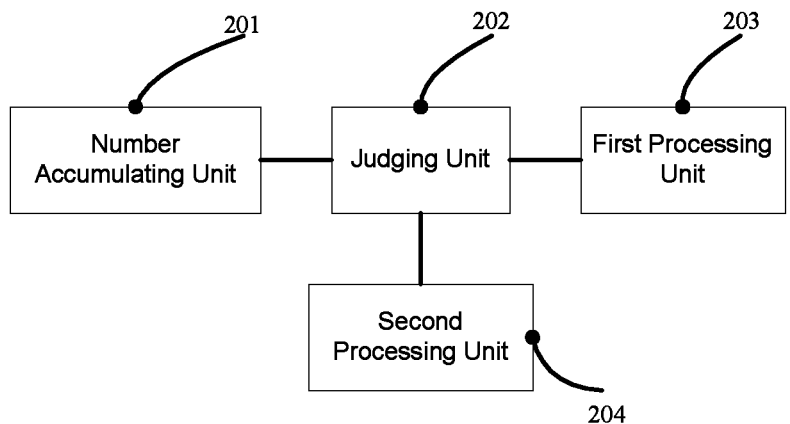
FIG. 2 is a functional structure diagram of a playback synchronization device according to an embodiment of the present disclosure.

FIG. 2 is a functional structure diagram of a playback synchronization device according to an embodiment of the present disclosure. Referring to FIG. 2, the playback synchronization device comprises:

A number accumulating unit 201 configured to accumulate a number of writes for writing data into an audio data buffer by a write pointer of a master device and a number of reads for reading data from the audio data buffer by a read pointer of a slave device. Specifically, a first accumulator may be used for temporarily storing the number of writes, and each time the write pointer writes data, a arithmetic logic unit in the accumulator performs the arithmetic operation of incrementing by one and stores the result of the operation in the first accumulator; similarly, a second accumulator may be used for temporarily storing the number of reads, and each time the read pointer reads data, the arithmetic logic unit in the accumulator performs the arithmetic operation of incrementing by one and stores the result of the operation in the second accumulator.

A judging unit 202 configured to judge a magnitude relationship between the number of writes and the number of reads when the number of writes reaches a predetermined number of times. Specifically, when the number of writes in the first accumulator reaches a predetermined number of times, a processor acquires the number of reads in the second accumulator and judges the magnitude relationship between the number of writes and the number of reads.

A first processing unit 203 configured to, if the judging unit 202 judges that the number of writes is greater than the number of reads, move the read pointer of the slave device in the audio data buffer towards a read direction by a certain length. The certain length is a product of a difference between the number of writes and the number of reads and a length of a single data packet.

If the number of writes is greater than the number of reads, it indicates that the speed of writing data by the master device is faster than the speed of reading data by the slave device, and the write data is not synchronized with the read data. At this point, the processor moves the read pointer of the slave device in the audio data buffer towards the read direction by a certain length so that the write data and the read data are synchronized. The certain length of movement is the product of the difference between the number of writes and the number of reads and the length of a single packet.

A second processing unit 204 configured to, if the judging unit 202 judges that the number of writes is less than the number of reads, direct the read pointer of the slave device to a zero data buffer, and when a number of new writes for newly writing data into the audio data buffer by the write pointer of the master device is equal to the difference between the number of reads and the number of writes, re-direct the read pointer of the slave device to an original position in the audio data buffer.

If the number of writes is less than the number of reads, it indicates that the speed of writing data by the master device is slower than the speed of reading data by the slave device, and the write data is not synchronized with the read data. At this point, the processor directs the read pointer of the slave device to the zero data buffer, data 0 in the zero data buffer will be read, and the data written by the master device will no longer be read from the audio data buffer. When the number of new writes for newly writing data into the audio data buffer by the write pointer of the master device is equal to the difference between the number of reads and the number of writes, the read pointer of the slave device is re-directed to an original position in the audio data buffer.

In an embodiment of the present disclosure, the playback synchronization device further comprises: a position acquiring unit and a data emptying unit (not shown in FIG. 2).

The position acquiring unit is configured to periodically acquire a write position of the write pointer of the master device in the audio data buffer and a read position of the read pointer of the slave device in the audio data buffer. Specifically, by using the algorithm unit in the processor, the write position of the write pointer and the read position of the read pointer can be acquired and stored in a specified storage unit.

The data emptying unit is configured to, if the difference between the write position and the read position is less than the length of the single data packet, or the difference between the write position and the read position is greater than a difference between a length of the audio data buffer and the length of the single data packet, empty data in the audio data buffer and clear the number of writes and the number of reads.

The processor acquires the write position and the read position in the specified storage unit, and performs a logical operation of subtraction on the positions using an arithmetic logic unit. If the difference between the write position and the read position is less than the length of a single data packet, or the difference between the write position and the read position is greater than the difference between the length of the audio data buffer and the length of a single data packet, it indicates that the relative state of the write data and the read data has exceeded a limit state. The data in the audio data buffer is emptied to re-write and re-read data, and the number of writes in the first accumulator and the number of reads in the second accumulator are cleared to restart the accumulation.

In an embodiment of the present disclosure, the playback synchronization device further comprises a number clearing unit (not shown in FIG. 2), configured to clear the number of writes and the number of reads, and re-accumulate the number of writes and the number of reads, respectively, after moving the read pointer of the slave device in the audio data buffer towards a read direction by a certain length, or re-directing the read pointer of the slave device to an original position in the audio data buffer. Specifically, after the movement operation of the read pointer is completed, the number of writes in the first accumulator and the number of reads in the second accumulator are both cleared to restart the accumulation and wait for the next judgment.

The play synchronization device according to the present embodiment can be used for executing the play synchronization method in the first embodiment as described above, and their principle and technical effects are similar and will not be repeated herein.

Third Embodiment

Figure 3:
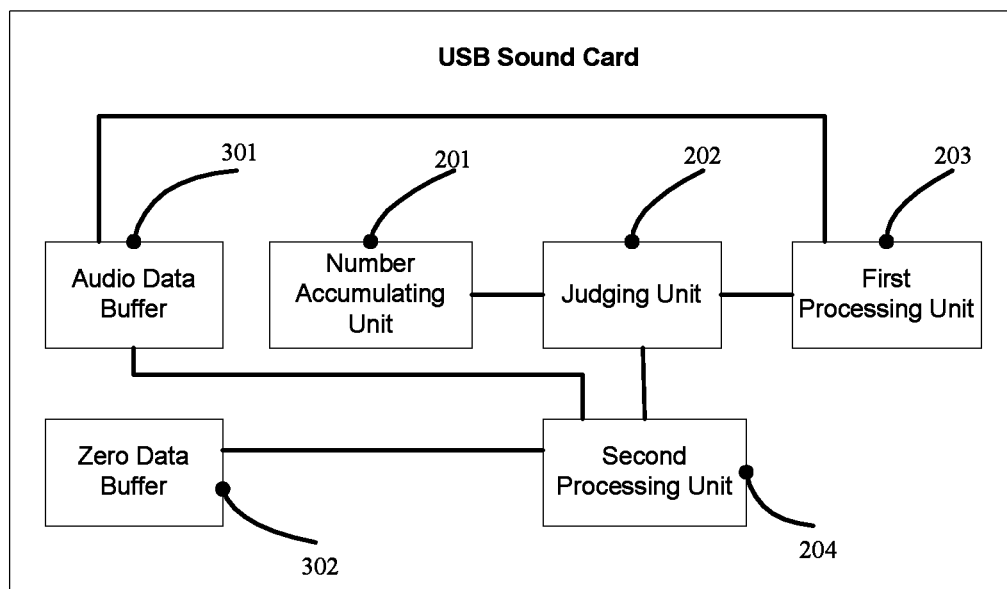
FIG. 3 is a functional structure diagram of a USB sound card according to an embodiment of the present disclosure.

FIG. 3 is a functional structure diagram of a USB sound card according to an embodiment of the present disclosure. Referring to FIG. 3, the USB sound card comprises an audio data buffer 301, a zero data buffer 302, a number accumulating unit 201, a judging unit 202, a first processing unit 203, and a second processing unit 204.

The number accumulating unit 201 is configured to accumulate a number of writes for writing data into the audio data buffer 301 by a write pointer of a master device and a number of reads for reading data from the audio data buffer 301 by a read pointer of a slave device, respectively.

The judging unit 202 is configured to judge a magnitude relationship between the number of writes and the number of reads when the number of writes reaches a predetermined number of times.

The first processing unit 203 is configured to, if the judging unit 202 judges that the number of writes is greater than the number of reads, move the read pointer of the slave device in the audio data buffer towards a read direction by a certain length. The certain length is a product of a difference between the number of writes and the number of reads and a length of a single data packet.

The second processing unit 204 is configured to, if the judging unit 202 judges that the number of writes is less than the number of reads, direct the read pointer of the slave device to the zero data buffer 203, and when a number of new writes for newly writing data into the audio data buffer 301 by the write pointer of the master device is equal to the difference between the number of reads and the number of writes, re-direct the read pointer of the slave device to an original position in the audio data buffer 301.

In an embodiment of the present disclosure, the USB sound card further comprises: a position acquiring unit and a data emptying unit (not shown in FIG. 3).

The position acquiring unit is configured to periodically acquire a write position of the write pointer of the master device in the audio data buffer and a read position of the read pointer of the slave device in the audio data buffer.

The data emptying unit is configured to, if a difference between the write position and the read position is less than the length of the single data packet, or the difference between the write position and the read position is greater than a difference between a length of the audio data buffer and the length of the single data packet, empty data in the audio data buffer and clear the number of writes and the number of reads.

In an embodiment of the present disclosure, the USB sound card further comprises a number clearing unit (not shown in FIG. 3), configured to clear the number of writes and the number of reads, and re-accumulate the number of writes and the number of reads, respectively, after moving the read pointer of the slave device in the audio data buffer towards a read direction by a certain length, or re-directing the read pointer of the slave device to an original position in the audio data buffer.

Thus, the USB sound card according to the third embodiment not only comprises the play synchronization device according to the second embodiment, but also comprises the audio data buffer region 301 and the zero data buffer region 302.

Fourth Embodiment

Figure 4:
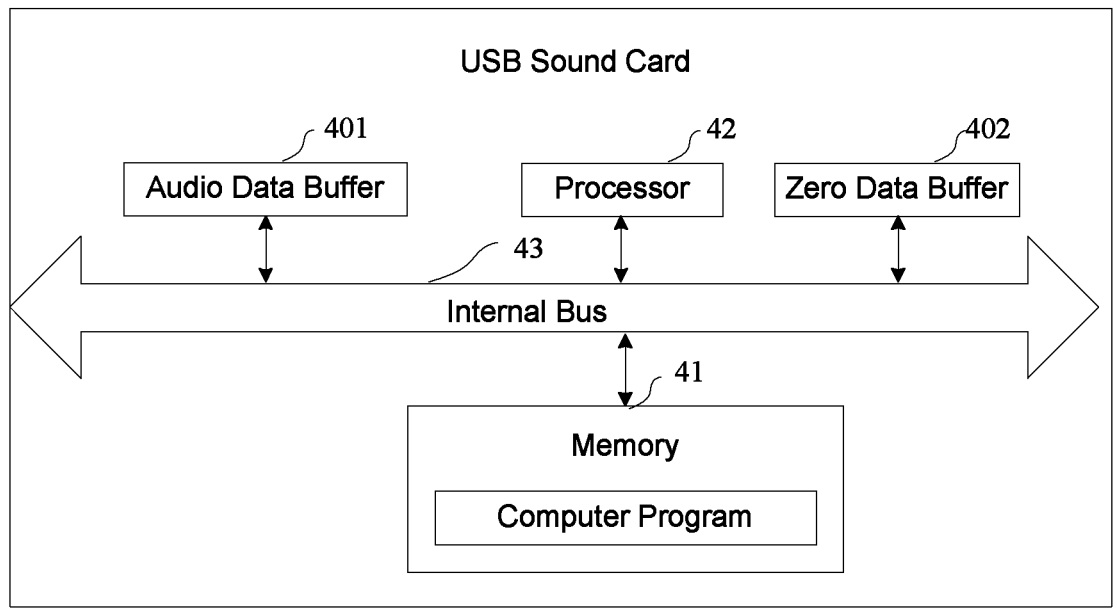
FIG. 4 is a functional structure diagram of another USB sound card according to an embodiment of the present disclosure.

FIG. 4 is a functional structure diagram of another USB sound card according to an embodiment of the present disclosure. Referring to FIG. 4, the USB sound card comprises an audio data buffer 402, a zero data buffer 402, a memory 41 and a processor 42, the memory 41 and the processor 42 are communicatively connected via an internal bus 43, the memory 41 stores a computer program executable by the processor 42, and when executed by the processor, the computer program is capable of implementing the play synchronization method of the first embodiment as described above.

In various embodiments, the memory 41 may be an internal memory or a non-volatile memory. The non-volatile memory may be a storage drive (e.g., hard disk drive), a solid state hard disk, any type of storage disk (such as optical disk, DVD), or similar storage medium, or a combination thereof. The internal memory may be RAM (Random Access Memory), volatile memory, non-volatile memory, or flash memory. Further, the non-volatile memory and the internal memory serve as a machine-readable storage medium on which computer programs executed by the processor 42 may be stored to implement the above playback synchronization method, which has been described in detail in the first embodiment illustrated in FIG. 1, and will not be repeated herein.

In sum, in the technical solutions according to the present disclosure, the number of writes for writing data into the audio data buffer by the write pointer of the master device and the number of reads for reading data from the audio data buffer by the read pointer of the slave device are acquired, and it is determined whether the data transmission of the master and slave devices is synchronized or not by judging the magnitude relationship between the number of writes and the number of reads. If it is not synchronized, the position of the read pointer is adjusted so that the write pointer and the read pointer are synchronized again, i.e., the write data and the read data are synchronized again. Thus, the problem that the clocks of the master and slave devices are relatively independent and the data transmission is not synchronized due to the clock deviation is solved.

The technical solutions of the present disclosure also provide a solution to the situation that the state of the write data and the read data exceeds a limit state. The write position of the write pointer and the read position of the read pointer are acquired, and it is judged whether the read and write data exceeds the limit state by the difference between the two positions. If the limit state is exceeded, all the written and read data are emptied to restart reading and writing of the data. The problems of data overflow and data loss caused by the read and write data exceeding the limit state are solved.

The above description is merely particular embodiments of the present disclosure. By the teaching of the present disclosure, a person skilled in the art can make other modifications or variations based on the above embodiments. A person skilled in the art should appreciate that, the detailed description above is only for the purpose of better explaining the present disclosure, and the protection scope of the present disclosure should be subject to the protection scope of the claims.

What is claimed is:

1. A playback synchronization method, comprising:
accumulating a number of writes for writing data into an audio data buffer by a write pointer of a master device and a number of reads for reading data from the audio data buffer by a read pointer of a slave device, respectively, and judging a magnitude relationship between the number of writes and the number of reads when the number of writes reaches a predetermined number of times;
if the number of writes is greater than the number of reads, moving the read pointer of the slave device in the audio data buffer towards a read direction by a certain length, the certain length being a product of a difference between the number of writes and the number of reads and a length of a single data packet; and
if the number of writes is less than the number of reads, directing the read pointer of the slave device to a zero data buffer, and then when a number of new writes for newly writing data into the audio data buffer by the write pointer of the master device is equal to the difference between the number of reads and the number of writes, re-directing the read pointer of the slave device to an original position in the audio data buffer.

2. The method according to claim 1, further comprising:
periodically acquiring a write position of the write pointer of the master device in the audio data buffer and a read position of the read pointer of the slave device in the audio data buffer;
if a difference between the write position and the read position is less than the length of the single data packet, or the difference between the write position and the read position is greater than a difference between a length of the audio data buffer and the length of the single data packet, emptying data in the audio data buffer and clearing the number of writes and the number of reads.

3. The method of claim 1 or 2, wherein after moving the read pointer of the slave device in the audio data buffer towards a read direction by a certain length, or re-directing the read pointer of the slave device to an original position in the audio data buffer, the method further comprises:
   clearing the number of writes and the number of reads, and re-accumulating the number of writes and the number of reads, respectively.

4. A playback synchronization device, comprising:
   a number accumulating unit configured to accumulate a number of writes for writing data into an audio data buffer by a write pointer of a master device and a number of reads for reading data from the audio data buffer by a read pointer of a slave device respectively;
   a judging unit configured to judge a magnitude relationship between the number of writes and the number of reads when the number of writes reaches a predetermined number of times;
   a first processing unit configured to, if the judging unit judges that the number of writes is greater than the number of reads, move the read pointer of the slave device in the audio data buffer towards a read direction by a certain length, the certain length being a product of a difference between the number of writes and the number of reads and a length of a single data packet; and
   a second processing unit configured to, if the judging unit judges that the number of writes is less than the number of reads, direct the read pointer of the slave device to a zero data buffer, and then when a number of new writes for newly writing data into the audio data buffer by the write pointer of the master device is equal to the difference between the number of reads and the number of writes, re-direct the read pointer of the slave device to an original position in the audio data buffer.

5. The device according to claim 4, further comprising:
   a position acquiring unit configured to periodically acquire a write position of the write pointer of the master device in the audio data buffer and a read position of the read pointer of the slave device in the audio data buffer; and
   a data emptying unit configured to, if a difference between the write position and the read position is less than the length of the single data packet, or the difference between the write position and the read position is greater than a difference between a length of the audio data buffer and the length of the single data packet, empty data in the audio data buffer and clear the number of writes and the number of reads.

6. The device according to claim 4 or 5, further comprising:
   a number clearing unit configured to clear the number of writes and the number of reads, and re-accumulate the number of writes and the number of reads, respectively, after moving the read pointer of the slave device in the audio data buffer towards a read direction by a certain length, or re-directing the read pointer of the slave device to an original position in the audio data buffer.

7. A USB sound card, comprising an audio data buffer, a zero data buffer, a memory and a processor, wherein the memory and the processor are communicatively connected via an internal bus, the memory stores therein a computer program executable by the processor, and when executed by the processor, the computer program is capable of implementing a playback synchronization method, the method comprises:
   accumulating a number of writes for writing data into an audio data buffer by a write pointer of a master device and a number of reads for reading data from the audio data buffer by a read pointer of a slave device, respectively, and judging a magnitude relationship between the number of writes and the number of reads when the number of writes reaches a predetermined number of times;
   if the number of writes is greater than the number of reads, moving the read pointer of the slave device in the audio data buffer towards a read direction by a certain length, the certain length being a product of a difference between the number of writes and the number of reads and a length of a single data packet; and
   if the number of writes is less than the number of reads, directing the read pointer of the slave device to a zero data buffer, and then when a number of new writes for newly writing data into the audio data buffer by the write pointer of the master device is equal to the difference between the number of reads and the number of writes, re-directing the read pointer of the slave device to an original position in the audio data buffer.

8. The USB sound card according to claim 7, the method further comprises:
   periodically acquiring a write position of the write pointer of the master device in the audio data buffer and a read position of the read pointer of the slave device in the audio data buffer;
   if a difference between the write position and the read position is less than the length of the single data packet, or the difference between the write position and the read position is greater than a difference between a length of the audio data buffer and the length of the single data packet, emptying data in the audio data buffer and clearing the number of writes and the number of reads.

9. The USB sound card according to claim 7, wherein after moving the read pointer of the slave device in the audio data buffer towards a read direction by a certain length, or re-directing the read pointer of the slave device to an original position in the audio data buffer, the method further comprises:
   clearing the number of writes and the number of reads, and re-accumulating the number of writes and the number of reads, respectively.

* * * * *